(12) United States Patent
Yamamuro

(10) Patent No.: US 10,774,166 B2
(45) Date of Patent: Sep. 15, 2020

(54) CURABLE RESIN COMPOSITION

(71) Applicant: THREE BOND CO., LTD., Hachioji-shi, Tokyo (JP)

(72) Inventor: Nao Yamamuro, Hachioji (JP)

(73) Assignee: THREE BOND CO., LTD., Tokyo (JP)

(*) Notice: Subject to any disclaimer, the term of this patent is extended or adjusted under 35 U.S.C. 154(b) by 0 days.

(21) Appl. No.: 15/513,594

(22) PCT Filed: Jul. 10, 2015

(86) PCT No.: PCT/JP2015/069958
§ 371 (c)(1),
(2) Date: Mar. 23, 2017

(87) PCT Pub. No.: WO2016/051915
PCT Pub. Date: Apr. 7, 2016

(65) Prior Publication Data
US 2018/0230256 A1 Aug. 16, 2018

(30) Foreign Application Priority Data
Sep. 29, 2014 (JP) ................. 2014-198112

(51) Int. Cl.
| | |
|---|---|
| *C08F 220/58* | (2006.01) |
| *C09K 3/10* | (2006.01) |
| *C08F 290/04* | (2006.01) |
| *C08F 226/06* | (2006.01) |
| *C08F 2/46* | (2006.01) |
| *C08F 220/18* | (2006.01) |
| *C08K 5/14* | (2006.01) |
| *C08L 33/24* | (2006.01) |
| *C08F 290/12* | (2006.01) |

(52) U.S. Cl.
CPC .............. *C08F 220/58* (2013.01); *C08F 2/46* (2013.01); *C08F 220/18* (2013.01); *C08F 226/06* (2013.01); *C08F 290/046* (2013.01); *C08K 5/14* (2013.01); *C08L 33/24* (2013.01); *C09K 3/10* (2013.01); *C08F 290/04* (2013.01); *C08F 290/12* (2013.01); *C08F 290/126* (2013.01); *C08L 2201/08* (2013.01); *C08L 2203/206* (2013.01)

(58) Field of Classification Search
CPC .... C08F 220/58; C08F 226/06; C08F 263/06; C08F 265/04; C08F 265/06; C08F 290/04; C08F 290/042; C08F 290/044; C08F 290/046; C08F 290/048; C08F 290/12; C08F 290/122; C08F 290/124; C08F 290/126; C08F 290/128
See application file for complete search history.

(56) References Cited

U.S. PATENT DOCUMENTS

| | | | | |
|---|---|---|---|---|
| 4,309,561 A * | 1/1982 | Huemmer | ............... | C08F 20/36 522/14 |
| 4,886,840 A * | 12/1989 | Mukohyama | ........... | G03F 7/027 522/103 |
| 2005/0215706 A1 | 9/2005 | Sakamoto et al. | | |
| 2009/0025870 A1* | 1/2009 | Tanaka | ................. | C08F 265/04 156/273.3 |
| 2010/0076107 A1 | 3/2010 | Kitano et al. | | |
| 2011/0009517 A1 | 1/2011 | Tamai et al. | | |
| 2011/0068512 A1 | 3/2011 | DeCato et al. | | |
| 2013/0165593 A1* | 6/2013 | Ichiryu | ............... | C08F 293/005 525/303 |
| 2015/0210874 A1* | 7/2015 | Mizutani | ................. | B29C 43/00 428/137 |

FOREIGN PATENT DOCUMENTS

| | | |
|---|---|---|
| EP | 2 110 394 A1 | 10/2009 |
| JP | 2001-192425 A | 7/2001 |
| JP | 2005-272703 A | 10/2005 |
| JP | 2005-290174 A | 10/2005 |
| JP | 2006-273918 A | 10/2006 |
| JP | 2009-249613 A | 10/2009 |
| JP | 2011-527722 A | 11/2011 |

(Continued)

OTHER PUBLICATIONS

International Preliminary Report on Patentability dated Apr. 4, 2017 which issued in the Patent Application No. PCT/JP2015/069958, including an English translation.

(Continued)

*Primary Examiner* — Ling Siu Choi
*Assistant Examiner* — David L Miller
(74) *Attorney, Agent, or Firm* — Dickinson Wright PLLC

(57) ABSTRACT

An object of the present invention is to provide a curable resin composition having low viscosity and being capable of forming a cured product which is excellent in the flexibility and the heat resistance.

The present invention is a curable resin composition including:
a (meth)acrylic group-containing vinyl-based polymer (A), a monomer (B) represented by the following Chemical formula (1), and a radical initiator (C).

[Chemical formula 1]

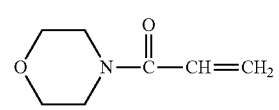

(1)

11 Claims, No Drawings

(56) References Cited

FOREIGN PATENT DOCUMENTS

| JP | 2011-252079 | A |   | 12/2011 |           |            |
|----|-------------|---|---|---------|-----------|------------|
| JP | 2013-18842  | A |   | 1/2013  |           |            |
| JP | 2014-11297  | A |   | 1/2014  |           |            |
| JP | 2015071719  | A | * | 4/2015  |           |            |
| JP | 2015074719  | A | * | 4/2015  |           |            |
| WO | WO-2009148182 | A1 | * | 12/2009 | ................ | C09J 4/00 |
| WO | WO 2012/093465 | A1 |   | 7/2012 |           |            |
| WO | WO-2013027672 | A1 | * | 2/2013 | ........... | C09D 11/101 |

OTHER PUBLICATIONS

Supplementary European Search Report dated Apr. 25, 2018, which issued in the corresponding Patent Application No. 15847116.9.
International Search Report and Written Opinion dated Oct. 27, 2015 in PCT Application No. PCT/JP2015/069958.
Chinese Office Action dated Jun. 5, 2018, which issued in the corresponding Chinese Patent Application No. 201580052495.5, including English translation.
Japanese Official Notice of Reasons for Refusal dated Jul. 2, 2019, which issued in the corresponding Japanese Patent Application No. 2016-551599, including English translation.
European Communication Pursuant to Article 94(3) EPC dated Mar. 15, 2019, which issued in the corresponding European Patent Application No. 15 847 116.9.
Chinese Office Action dated Jan. 4, 2019, which issued in the corresponding Chinese Patent Application No. 201580052495.5, including English translation.

* cited by examiner

CURABLE RESIN COMPOSITION

TECHNICAL FIELD

The present invention relates to a curable resin composition having low viscosity and being capable of forming a cured product which is excellent in the flexibility and the heat resistance.

BACKGROUND ART

Conventionally, in an adhesive agent or sealing agent for an engine periphery or in-vehicle member of an automobile, heat resistance with which changes of rubber properties are small even after the adhesive agent or sealing agent left to stand for a long period of time under a high-temperature environment of 120° C. is required. In JP 2005-272703 A (corresponding to the specification of US 2005/215706 A) and JP 2011-252079 A, there is a disclosure that a silicone resin is suitable as the adhesive agent or sealing agent described above. However, siloxane with a low molecular weight existed in a silicone resin has a problem causing trouble in an electric contact point, and has a fear of an adverse effect when being used in electric or electronic parts. Under these circumstances, in recent years, as a material in place of the silicone resin, a composition using a (meth) acrylic polymer has been attracting attention.

For example, in JP 2006-273918 A, there is a disclosure of a composition for electric or electronic parts, which includes a (meth)acrylic polymer having a (meth)acrylic group and an initiator, but there has been a problem that the composition has high viscosity and poor workability when applied in an adhesive agent or a sealing agent. Therefore; as a technique generally used for decreasing the viscosity, mixing of a polymerizable monomer can be mentioned, but a polymerizable monomer that is compatible with a (meth) acrylic polymer and retains favorable curability is few, and the polymerizable monomer that can be used is limited. In a case where the compatibility is poor, a problem that cloudiness is caused at the time of curing and the deep portion is not cured is generated. Further, depending on the type of the polymerizable monomer, there is a problem that the cured product to be obtained has poor flexibility and the like.

In JP 2011-527722 W (corresponding to the specification of US 2011/068512 A), it has been disclosed that a composition having low viscosity, of which the cured product has rubber properties, can be obtained by selecting dimethyl acrylamide as a polymerizable monomer for an acrylate-terminated telechelic polyacrylate.

SUMMARY OF INVENTION

However, in a case of a composition disclosed in JP 2011-527722 W, the rubber properties of the cured product to be obtained are largely changed due to heat deterioration, and the heat RESISTANCE of the composition has been insufficient.

Therefore, an object of the present invention is to provide a curable resin composition, a cured product of the curable resin composition has improved heat resistance. Another object of the present invention is to obtain a curable resin composition having low viscosity and being capable of forming a cured product which is excellent in the flexibility and the heat resistance.

Accordingly, the present inventors have conducted intensive studies so as to solve the above-described problems. As a result, the present inventors have found that the above-described problems can be solved by a curable resin composition containing a (meth)acrylic group-containing vinyl-based polymer (A), a monomer (B) represented by the following Chemical formula (1), and a radical initiator (C), and thus have completed the present invention.

[Chemical formula 1]

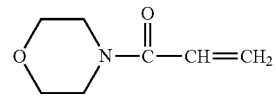

(1)

DESCRIPTION OF EMBODIMENTS

One embodiment of the present invention is to provide a curable resin composition containing a (meth)acrylic group-containing vinyl-based polymer (A), a monomer (B) represented by the following Chemical formula (1), and a radical initiator (C). According to such a constitution, the heat resistance of the cured product to be obtained can be improved. Further, a curable resin composition having low viscosity, of which a cured product is excellent in the flexibility and the heat resistance, can be obtained. In addition, the term "low viscosity" in the present specification indicates that the viscosity at 25° C. as measured by a method described in the following Examples is 200 Pa·s or less.

[Chemical formula 2]

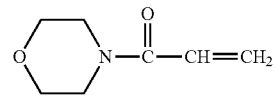

(1)

Hereinafter, constituent components of the curable resin composition according to the present invention, and the embodiment for carrying out the present invention will be described in detail. In addition, in the present specification, the expression "X to Y" is used with the meaning of including the numerical values described before and after the "to" (X and Y) as the lower limit value and the upper limit value, respectively. Further, unless otherwise specifically noted, operations and measurements of properties, and the like are performed under the conditions of room temperature (20 to 25° C.)/relative humidity 40 to 50% RH.

Component (A)

A component (A) of the present invention is a (meth) acrylic group-containing vinyl-based polymer. As an example of the vinyl-based polymer, a (meth)acrylic polymer, and an isobutylene-based polymer can be mentioned, but because of being excellent in the compatibility with a component (B) of the present invention, a (meth)acrylic polymer is preferred. Herein, the term "(meth)acryl" is a generic term for acryl and methacryl. In addition, in the component (A), a (meth)acrylic group is present on the side chain or at the end of the molecule, and from the viewpoint of being more excellent in the reactivity, the (meth)acrylic group is preferably present at the end. From the viewpoint of being excellent in the rubber properties, the (meth)acrylic group is particularly preferably present at each of both ends in the molecule. That is, in a preferred embodiment of the present invention, the (meth)acrylic group-containing vinyl-based polymer (A) is a (meth)acrylic polymer containing (meth)acrylic groups at both ends.

The number average molecular weight of the component (A) is particularly 3,000 to 100,000, and particularly preferably 5,000 to 50,000. When the number average molecular weight is less than 3,000, there may be a fear that a flexible cured product will not be obtained. On the other hand, when the number average molecular weight exceeds 100,000, there may be a fear that the viscosity will be increased, and stringiness will be generated when the curable resin composition is used for coating.

In addition, the viscosity of the component (A) is preferably 100 to 1000 Pa·s, and particularly preferably 150 to 600 Pa·s at a measurement temperature of 23° C.

The component (A) can be obtained by various polymerization methods. The method is not particularly limited, but is preferably a radical polymerization method from the viewpoint of the easiness of the reaction control, and among the radical polymerization methods, a living radical polymerization method is preferred. Further, as a method for producing a polymer, which utilizes a living radical polymerization method, it is not particularly limited, but a reversible addition-fragmentation chain transfer (RAFT) polymerization method, an atom transfer radical polymerization (ATRP) method, or the like can be mentioned. In addition, as the method for introducing a (meth)acrylic group at the end after a vinyl-based polymer is obtained, a known technique is used. As a specific introduction method, (1) a method by the reaction of a vinyl-based polymer having a hydroxyl group at the end, with a (meth)acrylate compound having chlorine, bromine, or a hydroxyl group, (2) a method by the reaction of a vinyl-based polymer having a halogen group at the end, with a (meth)acrylate compound containing an alkali metal ion or a quaternary ammonium ion, (3) a method by the reaction of a vinyl-based polymer having a hydroxyl group at the end, with a diisocyanate compound, and then by the reaction of the remaining isocyanate groups with a hydroxyl group-containing (meth)acrylate, or the like can be mentioned.

As the monomer constituting a main chain skeleton of the vinyl-based polymer, it is not particularly limited, and various monomers can be used. Specific examples of the monomer include (meth)acrylic acid, methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, n-pentyl (meth)acrylate, n-hexyl (meth)acrylate, cyclohexyl (meth)acrylate, n-heptyl (meth)acrylate, n-octyl (meth)acrylate, 2-ethylhexyl (meth)acrylate, nonyl (meth)acrylate, decyl (meth)acrylate, dodecyl (meth)acrylate, phenyl (meth)acrylate, toluyl (meth)acrylate, benzyl (meth)acrylate, 2-methoxyethyl (meth)acrylate, 3-methoxybutyl (meth)acrylate, 2-hydroxyethyl (meth)acrylate, 2-hydroxypropyl (meth)acrylate, stearyl (meth)acrylic acrylate, glycidyl (meth)acrylate, 2-aminoethyl(meth)acrylate, γ-(methacryloyloxypropyl)acrylic trimethoxysilane, an ethylene oxide adduct of (meth)acrylate, trifluoromethylmethyl (meth)acrylate, 2-trifluoromethylethyl (meth)acrylate, 2-perfluoroethylethyl (meth)acrylate, 2-perfluoroethyl-2-perfluorobutylethyl (meth)acrylate, 2-perfluorohexylethyl (meth)acrylate, perfluoromethyl (meth)acrylate, diperfluoromethylmethyl (meth)acrylic acrylate, 2-perfluoromethyl-2-perfluoroethylmethyl (meth)acrylate, 2-perfluorohexylethyl (meth)acrylate, 2-perfluorodecylethyl (meth)acrylate, and 2-perfluorohexadecylethyl (meth)acrylate, but not limited to these ones. In the present invention, the polymerination can be performed by selecting the monomer from the above, but preferably, a (meth)acrylic monomer having a hydrocarbon group is preferably selected.

Examples of the product available on the market of the (meth)acrylic polymer having (meth)acrylic groups at both ends, which is a component (A), include RC200C, RC210C, RC220C, RC100C, and RC120C (manufactured by KANEKA CORPORATION). As the product available on the market of the (meth)acrylic polymer having a (meth)acrylic group at one end, MM110C (manufactured by KANEKA CORPORATION), and the like can be mentioned, but the product is not limited to these ones.

In addition, the component (A) may be used singly alone or as a mixture of two or more kinds thereof.

The mixing amount of the component (A) is not particularly limited, but is, based on 100 parts by mass of the total amount of the component (A) and the component (B), preferably 95 parts by mass or less, more preferably 90 parts by mass or less, and furthermore preferably 70 parts by mass or less. Further, the mixing amount of the component (A) is not particularly limited, but is, based on 100 parts by mass of the total amount of the component (A) and the component (B), preferably 10 parts by mass or more, more preferably 30 parts by mass or more, and furthermore preferably 50 parts by mass or more.

Component (B)

The component (B) of the present invention is a monomer represented by the following Chemical formula (1), that is, acryloyl morpholine.

[Chemical formula 3]

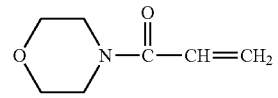

(1)

By the addition of a component (B), a synergistic effect of the component (A) of the present invention and the component (B) is exerted, and a curable resin composition having low viscosity, of which a cured product is excellent in the flexibility and the heat resistance, can be obtained. The component (B) may be either a product available on the market or a synthetic product, and as the product available on the market, ACMO manufactured by KJ Chemicals Corporation, and the like can be mentioned.

The mixing amount of the component (B) is not particularly limited, but is, based on 100 parts by mass of the total amount of the component (A) and the component (B), preferably 90 parts by mass or less, more preferably 80 parts by mass or less, furthermore preferably 70 parts by mass or less, and particularly preferably 50 parts by mass or less. Further, the mixing amount of the component (B) is not particularly limited, but is, based on 100 parts by mass of the total amount of the component (A) and the component (B), preferably 3 parts by mass or more, more preferably 5 parts by mass or more, furthermore preferably 7 parts by mass or more, and particularly preferably 30 parts by mass or more. When the mixing amount is less than 3 parts by mass, there may be a fear that the viscosity will be high and the workability will be poor, and when the mixing amount exceeds 90 parts by mass, there may be a fear that the flexibility of the cured product to be obtained will be poor. That is, as a preferred embodiment of the present invention, a curable resin composition containing the monomer (B) in an amount of 3 to 90 parts by mass based an 100 parts by mass of the total amount of the (meth)acrylic group-containing vinyl-based polymer (A) and the component (B) is provided.

Component (C)

The component (C) capable of being used in the present invention is a radical initiator. Examples of the component (C) include a photoradical polymerization initiator, and an organic peroxide. The curing form of the curable resin composition of the present invention can be selected from photocuring, heat curing, or redox curing by selecting the component (C) of the present invention. For example, as to a curable resin composition, a radical initiator is selected in a case of imparting the photocurability, and an organic peroxide can be selected in a case of imparting the heat curability or the curability by redox reaction. That is, as a preferred embodiment of the present invention, a curable resin composition, in which the radical initiator (C) is a photoradical polymerization initiator or an organic peroxide is provided.

The mixing amount of the component (C) is not particularly limited, but is, based on 100 parts by mass of the total amount of the component (A) and the component (B), preferably 10 parts by mass or less, and more preferably 5 parts by mass or less. Further, the mixing amount of the component (C) is not particularly limited, but is, based on 100 parts by mass of the total amount of the component (A) and the component (B), preferably 0.1 part by mass or more, and more preferably 0.5 part by mass or more. When the component (C) is less than 0.1 part by mass, there may be a fear that the curability will be poor, and when the mixing amount exceeds 10 parts by mass, there may be a fear that the storability the curable resin composition will be lowered.

The photoradical polymerisation initiator that is a component (C) used in the present invention is not limited as long as being a compound generating radicals by the irradiation with active energy rays. Examples of the component (C) include an acetophenone-based photoradical polymerization initiator, a benzoin-based photoradical polymerization initiator, a benzophenone-based photoradical polymerization initiator, a thioxanthone-based photoradical polymerization initiator, an acylphosphine oxide-based photoradical polymerization initiator, and a titanocene-based photoradical polymerization initiator. Among them, from the viewpoint of being excellent in the photocurability, an acetophenone-based photoradical polymerization initiator, and an acylphosphine oxide-based photoradical polymerization initiator are preferred. Further, these may be need alone or in combination of two or more kinds thereof.

Examples of the acetophenone-based photoradical polymerization initiator include diethoxy acetophenone, 2-hydroxy-2-methyl-1-phenylpropane-1-one, benzyl dimethyl ketal,
4-(2-hydroxyethoxy)phenyl-(2-hydroxy-2-propyl)ketone, 1-hydroxy-cyclohexyl-phenyl-ketone,
2-methyl-2-morpholino (4-thiomethylphenyl)propane-1-one,
2-benzyl-2-dimethylamino-1-(4-morpholinophenyl)butanone, and 2-hydroxy-2-methyl-1-[4-(1-methylvinyl) phenyl]propanone oligomer, but are not limited to these ones.

Examples of the acylphosphine oxide-based photoradical polymerization initiator include bis(2,4,6-trimethylbenzoyl)-phenylphosphine oxide, and 2,4,6-trimethylbenzoyl-diphenylphosphine oxide, but are not limited to these ones.

The organic peroxide that is a component (C) used in the present invention is a compound generating radical species by heating at 50° C. or more, or by redox reaction. When the redox reaction is used, radical species can be generated at room temperature, therefore, this is preferred. As the component (C), it is not particularly limited, but examples of the component (C) include ketone peroxides such as methyl ethyl ketone peroxide, cyclohexanone peroxide, 3,3,5-trimethylcyclohexanone peroxide, methylcyclohexanone peroxide, methyl acetoacetate peroxide, and acetylacetone peroxide; peroxy ketals such as 1,1-bis (t-butylperoxy)-3,3,5-trimethylcyclohexane, 1,1-bis(t-butylperoxy)cyclohexane, 2,2-bis(t-butylperoxy) octane, n-butyl-4,4-bis(t-butylperoxy)valerate, and 2,2-bis(t-butylperoxy)butane; hydroperoxides such as t-butyl hydroperoxide, cumene hydroperoxide, diisopropylbenzene hydroperoxide, p-menthane hydroperoxide, 2,5-dimethylhexane-2,5-dihydroperoxide, and 1,1,3,3-tetramethylbutyl hydroperoxide; dialkyl peroxides such as di-t-butyl peroxide, t-butylcumyl peroxide, dicumyl peroxide, α, α'-bis(t-butylperoxy-m-isopropyl)benzene, 2,5-dimethyl-2,5-di(t-butylperoxy)hexane, and 2,5-dimethyl-2,5-di(t-butylperoxy)-3-hexyne; diacyl peroxides such as acetyl peroxide, isobutyryl peroxide, octanoyl peroxide, decanoyl peroxide, lauroyl peroxide, 3,5,5-trimethylhexanoyl peroxide, succinic acid peroxide, benzoyl peroxide, 2,4-dichlorobenzoyl peroxide, and m-toluoyl peroxide; peroxydicarbonates such as diisopropyl peroxydicarbonate, di-2-ethylhexyl peroxydicarbonate, di-n-propyl peroxydicarbonate, bis-(4-t-butyl cyclohexyl)peroxydicarbonate, dimyristyl peroxydicarbonate, di-2-ethoxyethyl peroxydicarbonate, dimethoxyisopropyl peroxydicarbonate, di(3-methyl-3-methoxybutyl)peroxydicarbonate, and diallyl peroxydicarbonate; peroxy esters such as t-butyl peroxyacetate, t-butyl peroxyisobutyrate, t-butyl peroxypivalate, t-butyl peroxyneodecanoate, cumyl peroxyneodecanoate, t-butyl peroxy-2-ethylhexanoate, t-butyl peroxy-3,5,5-trimethylhexanoate, t-butyl percxylaurate, t-butyl peroxybenzoate, di-t-butyl peroxyisophthalate, 2,5-dimethyl-2,5-di (benzoylperoxy)hexane, t-butyl peroxymaleic acid, t-butyl peroxyisopropyl carbonate, cumyl peroxyoctoate, t-hexyl peroxyneodecanoate, t-hexyl peroxypivalate, t-butyl peroxyneohexanoate, t-hexyl peroxyneohexanoate, and cumyl peroxyneohexanoate; acetylcyclohexylsulfonyl peroxide; and t-butyl peroxyallylcarbonate. These organic peroxides may be used alone or in combination of multiple kinds thereof. Among them, cumene hydroperoxide is preferably used from the viewpoint of the curability.

In a case where an organic peroxide is used as the component (C), a curing accelerator can be mixed for the purpose of promoting redox reaction. As the curing accelerator, it is not particularly limited, but preferably, saccharin (o-benzoic acid sulfimide), a hydrazine-based compound, an amine compound, a mercaptan compound, a transition metal-containing compound, or the like is used.

Examples of the hydrazine-based compound include hydrazine, 1-acetyl-2-phenylhydrazine, 1-acetyl-2(p-tolyl) hydrazine, 1-benzoyl-2-phenylhydrazine, 1-(1', 1', 1'-trifluoro)acetyl-2-phenylhydrazine, 1,5-diphenyl-carbohydrazine, 1-formyl-2-phenylhydrazine, 1-acetyl-2-(p-bromophenyl)hydrazine, 1-acetyl-2-(p-nitrophenyl) hydrazine, 1-acetyl-2-(2'-phenylethylhydrazine), ethyl carbazate, p-nitrophenylhydrazine, and p-trisulfonylhydrazide.

Examples of the amine compound include heterocyclic secondary amine such as 2-ethylhexylamine, 1,2,3,4-tetrahydroquinone, and 1,2,3,4-tetrahydroquinaldine; heterocyclic tertiary amine such as quinoline, methylquinoline, quinaldine, and quinoxalinephenazine; aromatic primary amine such as toluidine; aromatic secondary amine such as N-methyl toluidine; aromatic tertiary amine such as N,N-dimethyl-p-toluidine, N,N-dimethyl-anisidine, and N,N-dimethylaniline; and an azole-based compound such as 1,2,4-triazole, oxazole, oxadiazol, thiadiazole, benzotriazole, hydroxybenzotriazole, benzoxasole, 1,2,3-benzothiadiazole, and 3-mercaptobenzotrizole.

Examples of the mercaptan compound include n-dodecyl mercaptan, ethyl mercaptan, butyl mercaptan, tris-[(3-mercaptopropionyloxy)-ethyl]-isocyanurate, pentaerythritol tetrakis (3-mercaptopropionate), dipentaerythritol hexakis (3-mercaptopropionate), trimethylolpropane tris(3-mercaptopropionate), trimethylolpropane tris thioglycolate, and pentaerythritol tetrakis thioglycolate.

As the transition metal-containing compound, preferably a metal chelate complex salt is used. For example, pentadione iron, pentadione cobalt, pentadione copper, propylenediamine copper, ethylenediamine copper, iron naphthenate, nickel naphthenate, cobalt naphthenate, copper naphthenate, copper octoate, iron hexoate, iron propionate, acetylacetone vanadium, and the like can be mentioned.

The curing accelerator may be used alone or in combination of multiple kinds thereof. Among them, a mixture of saccharin, a hydrazine-based compound, an amine-based compound, and a transition metal-containing compound is more preferred because of having a favorable curing promotion effect.

The mixing amount of the curing accelerator is not particularly limited, but is preferably 0.1 to 20 parts by mass relative to the component (C).

Optional Components

For the present invention, within the range not impairing the effects of the present invention, an additive agent including an adhesive auxiliary such as a compound having a (meth)acryloyl group except for the component (A) of the present invention, a (meth)acrylate having a phosphate group, and a silane coupling agent, a filling material, a tackifying agent such as a tackifier, a thermoplastic elastomer, rubbery polymer particles, a storage stabilizer such as BHT, an antioxidant, a light stabilizer, a plasticizer, dye, pigment, a flame retardant, a sensitizer, an organic solvent, a heavy metal deactivator, an ion trapping agent, an emulsifier, a water dispersion stabilizer, an antifoaming agent, a release agent, a leveling agent, wax, a rheology control agent, and a surfactant may be added in an adequate amount.

As a compound having a (meth)acryloyl group, for example, a monofunctional, bifunctional, trifunctional, or polyfunctional monomer, or an oligomer can be used. These can be used alone or as a mixture of two or more kinds thereof. Further, the mixing amount of the compound having a (meth)acryloyl group is not particularly limited, but is, preferably 0.1 to 300 parts by mass based on 100 parts by mass of the total amount of the component (A) and the component (B).

Examples of the monofunctional monomer include lauryl (meth)acrylate, stearyl (meth)acrylate, tetrahydrofurfuryl (meth)acrylate, caprolactone-modified tetrahydrofurfuryl (meth)acrylate, cyclohexyl (meth)acrylate, dicyclopentanyl (meth)acrylate, dicyclopentenyl (meth)acrylate, dicyclopentenyloxy (meth)acrylate, isobornyl (meth)acrylate, adamantyl (meth)acrylate, benzyl (meth)acrylate, phenyl (meth)acrylate, phenoxyethyl (meth)acrylate, phenoxydiethylene glycol (meth)acrylate, phenoxytetraethylene glycol (meth)acrylate, nonylphenoxyethyl (meth)acrylate, butoxyethyl (meth)acrylate, 2-hydroxyethyl (meth)acrylate, 2-hydroxypropyl (meth)acrylate, 4-hydroxybutyl (meth)acrylate, glycerol (meth)acrylate, modified butyl (meth)acrylate, N,N-dimethylaminoethyl (meth)acrylate, and N,N-diethylaminoethyl (meth)acrylate. From the viewpoint of the compatibility of the component (A) and component (B) of the present invention, and of being excellent in the curability, cyclohexyl (meth)acrylate, dicyclopentanyl (meth)acrylate, dicyclopentenyl (meth)acrylate, dicyclopentenyloxy (meth)acrylate, isobornyl (meth)acrylate, adamantyl (meth)acrylate, benzyl (meth)acrylate, phenyl (meth)acrylate, phenoxyethyl (meth)acrylate, 2-hydroxyethyl (meth)acrylate, 2-hydroxypropyl (meth)acrylate, and 4-hydroxybutyl (meth)acrylate are preferred.

Examples of the bifunctional monomer include neopentyl glycol di(meth)acrylate, stearic acid-modified pentaerythritol di(meth)acrylate, dicyclopentenyl diacrylate, di(meth)acryloyl isocyanurate, alkylene oxide-modified bisphenol di(meth)acrylate, and epoxy (meth)acrylate.

Examples of the trifunctional monomer include trimethylolpropane tri(meth)acrylate, pentaerythritol tri(meth)acrylate, and tris(acryloyloxyethyl) isocyanurate.

Examples of the polyfunctional monomer include ditrimethylol propane tetra (meth)acrylate, pentaerythritol tetra (meth)acrylate, dipentaerythritol monohydroxy penta(meth)acrylate, alkyl-modified dipentaerythritol pentaacrylate, and dipentaerythritol hexa(meth)acrylate. These polymerizable monomers can be used alone or as a mixture of two or more kinds thereof.

Examples of the oligomer include urethane (meth)acrylate having a polybutadiene skeleton, urethane (meth)acrylate having a hydrogenated polybutadiene skeleton, urethane (meth)acrylate having a polycarbonate skeleton, urethane (meth)acrylate having a polyether skeleton, urethane (meth)acrylate having a polyester skeleton, urethane (meth)acrylate having a castor oil skeleton, isoprene-based (meth)acrylate, and hydrogenated isoprene-based (meth)acrylate.

Examples of the silane coupling agent include a glycidyl group-containing silane coupling agent such as 3-acryloxypropyltrimethoxysilane, 3-glycidoxypropylmethyldimethoxysilane, 3-glycidoxypropylmethyldiethoxysilane, 3-glycidoxypropylmethyldipropyloxysilane, 3-glycidoxypropylmethyldimethylmonomethoxysilane, 3-glycidoxypropyldimethylmonoethoxysilane, 3-glycidoxypropyldimethylmonopropyloxysilane, 2-(3,4-epoxycyclohexyl)ethyltrimethoxysilane, 3-glycidoxypropyltriethoxysilane, 3-glycidoxypropyltrimethoxysilane, and 3-glycidoxypropylmethyldiethoxysilane, a vinyl group-containing silane coupling agent such as vinyltris (β-methoxyetoxy)silane, vinyltriethoxysilane, and vinyltrimethoxysilane, a (meth)acrylic group-containing silane coupling agent such as 3-methacryloxypropylmethyldimethoxysilane, 3-methacryloxypropylmethyldiethoxysilane, 3-methacryloxypropyldimethylmonomethoxysilane, 3-methacryloxypropyldimethylmonoethoxysilane, 3-acryloxypropylmethyidipropyloxysilane, 3-acryloxypropylmethyldimethoxysilane, 3-acryloxypropylmethyldiethoxysilane, 3-acryloxypropylmethyldipropyloxysilane, 3-acryloxypropyldimethylmonopropyloxysilane, 3-acryloxypropyldimethylmonoraethoxysilane, 3-acryloxypropyldimethylmonoethoxysilane, 3-acryloxypropyidimethylmonopropyloxysilane, and γmethacryloxypropyltrimethoxysilane, an amino group-containing silane coupling agent such as N-β-(aminoethyl)-γ-aminopropyltrimethoxysilane, γ-aminopropyltriethoxysilane, and N-phenyl-γ-aminopropyltrimethoxysilane, γ-mercaptopropyltrimethoxysilane, and γ-chloropropyltrimethoxysilane. Among them, from the viewpoint of being excellent in the adhesive strength, a glycidyl group-containing silane coupling agent, a vinyl group-containing silane coupling agent, or a (meth)acrylic group-containing silane coupling agent is preferred, and a (meth)acrylic group-containing silane coupling agent is more preferred. These may be used alone or in combination of two or more kinds thereof. Further, the mixing amount of the silane coupling agent is, based on 100 parts by mass of the total amount of the component (A) and the component (B) of the present invention, preferably 0.1 to 20 parts by mass.

Examples of the (meth)acrylate having a phosphate group include 2-hydroxymethyl(meth)acrylate acid phosphate, 2-hydroxyethyl(meth)acrylate acid phosphate, 2-hydroxypropyl (meth)acrylate acid phosphate, ethylene oxide-modified phosphoric acid diacrylate, ethylene oxide-modified phosphoric acid triacrylate, ethylene oxide-modified phosphoric acid di(meth)acrylate, and caprolactone-modified ethylene oxide-modified phosphoric acid di(meth)acrylate.

Examples of the filling material include glass, silica, alumina, talc, mica, silicone rubber powder, calcium carbonate, aluminum nitride, carbon powder, kaolin clay, dry clay mineral, and dry diatomaceous earth.

The average particle diameter of the filling material is preferably 0.001 to 100 µm, more preferably 0.01 to 50 µm, and particularly preferably 0.1 to 20 µm. When the average particle diameter of the filling material is lower than 0.001 µm, the viscosity of a sealing agent for a photoelectric conversion element becomes high, and there may be a fear that the workability of the coating and the like will be poor; and when the average particle diameter exceeds 100 µm, there may be a fear that the water vapor barrier property of the cured product to be obtained will be poor. Further, the measurement of the average particle diameter is performed by a laser diffraction method. In addition, the mixing amount of the filling material is not particularly limited, but is, based on 100 parts by mass of the total amount of the component (A) and the component (B), (preferably 0.1 to 300 parts by mass, more preferably 1 to 200 parts by mass, and particularly preferably 5 to 100 parts by mass.

A silica-based filling material is mixed for the purpose of improving the mechanical strength of the cured product to be obtained. The silica-based filling material may be either synthetic silica or natural silica. The synthetic silica may be either dry silica (fumed silica), or wet silica. The fumed silica may be either hydrophilic fumed silica, or hydrophobic fumed silica, and preferably, hydrophobic fumed silica that has been hydrophobized with dimethyldichlorosilane, hexamethylsilazane, silicone oil, aminosilane, alkylsilane having 1 to 12 carbon atoms, silane having a (meth)acryloyl group, or the like can be used. Examples of the product available on the market of the hydrophobic fumed silica include AEROSIL R974, R972, R9200, R976, R976S, RX50, NAX50, NX90, RX200, R8200, RX300, R812, R812S, RY50, NY50, RY200S, R202, RY200, RY300, R104, R106, RA200H, RA200HS, R805, R816, RM50, R711, and R7200 (manufactured by NIPPON AEROSIL CO., LTD.).

Among the optional components described above, an antioxidant and a light stabilizer are preferably added in order to improve the weather resistance of the curable resin composition. As the antioxidant and the light stabilizer, a product available on the market can be used. Examples of the product available on the market include SUMILIZER BHT, SUMILIZER S, SUMILIZER BP-76, SUMILIZER MDP-S, SUMILIZER GM, SUMILIZER BBM-S, SUMILIZER WX-R, SUMILIZER NW, SUMILIZER BP-179, SUMILIZER BP-101, SUMILIZER GA-80, SUMILIZER TNP, SUMILIZER TPP-R, and SUMILIZER P-16 (manufactured by Sumitomo Chemical Company, Limited); ADK STAB AO-20, ADK STAB AO-30, ADK STAB AO-40, ADK STAB AO-50, ADK STAB AO-60, ADK STAB AO-70, ADK STAB AO-80, ADK STAB AO-330, ADK STAB PEP-4C, ADK STAB PEP-8, ADK STAB PEP-24G, ADK STAB PEP-36, ADK STAB HP-10, ADK STAB 2112, ADK STAB 260, ADK STAB 522A, ADK STAB 329K, ADK STAB 1500, ADK STAB C, ADK STAB 135A, and ADK STAB 3010 (manufactured by ADEKA CORPORATION); and Tinuvin770; Tinuvin765, Tinuvin144, Tinuvin622, Tinuvin111, Tinuvin123, and Tinuvin292 (manufactured by Ciba Specialty Chemicals). The mixing amount of these antioxidant and light stabilizer is not particularly limited, but is, based on 100 parts by mass of the component (A), preferably 0.001 to 10 parts by mass, and more preferably 0.01 to 5 parts by mass.

The curable resin composition of the present invention may be any one of one-liquid type, two-liquid type, or multi-liquid type of two- or more-liquid. The light source used at the time of curing the curable resin composition of the present invention by the irradiation with light such as UVrays, visible light, or the like is not particularly limited, and examples of the light source include a low-pressure mercury lamp, a low-pressure mercury lamp, a high-pressure mercury lamp, an ultrahigh-pressure mercury lamp, a black-light lamp, a microwave-excited mercury lamp, a metal halide lamp, a sodium lamp, a halogen lamp, a xenon lamp, an LED, a fluorescent lamp, sunlight, and an electron beam irradiator. The irradiation amount of the light irradiation is, from the viewpoint of the characteristics of the cured product to be obtained, preferably 10 kJ/m$^2$ or more, and more preferably 15 kJ/m$^2$ or more.

As the application to suitably use the curable resin composition of the present invention, a sealing agent, a sealing material, a potting agent, an adhesive agent, a coating material, a lining material, an adhesive agent, or the like can be mentioned. Among them, the curable resin composition has low viscosity, and the cured product to be obtained is excellent in the characteristics for the flexibility and the heat resistance, therefore, the curable resin composition is preferably applied in a sealing agent, a potting agent, or an adhesive agent. That is, as a preferred embodiment of the present invention, a curable resin composition for a sealing agent or a potting agent is provided.

In a case where a curable resin composition of the present invention is used as a sealing agent, for example, the following method can be mentioned, but is not only the one to be used. That is, a flange that is an article to be sealed is coated with the curable resin composition by using a coater, and the curable resin composition is cured by irradiating the curable resin composition with light. The sealing agent of the cured product is joined to a flange portion of an opposing article to be sealed, and exerts the sealing property by pressure contact. Further, in order to exert the reliable sealing performance, the pressure contact is performed by setting the compression ratio of the sealing agent to preferably 10% or more, and more preferably 15% or more.

As the particularly preferred application of the curable resin composition of the present invention, because the cured product to be obtained is excellent in the characteristics for the flexibility and the heat resistance, a sealing agent for an in-vehicle control device case or an in-vehicle motor case of an electronic substrate or the like, a potting agent for an in-vehicle electronic substrate or an in-vehicle electrical and electronic part, or the like can be mentioned. That is, as a preferred embodiment of the present invention, a curable resin composition for a sealing agent for an in-vehicle control device case or an in-vehicle motor case is provided. Further, as another preferred embodiment of the present invention, a curable resin composition for potting for in-vehicle electrical and electronic part is provided.

The in-vehicle control device case is also referred to as an electronic control unit, and specific examples of the in-vehicle control device case include an engine control device (engine control unit), a throttle control device, and an exhaust gas recirculation control device. Further, specific example of the in-vehicle motor case includes a motor case for a power window or wipers. Specific example of the electronic substrate includes an electronic substrate for an engine control device, a throttle control device, an exhaust gas recirculation control device, or the like. Further, specific examples of the in-vehicle electrical and electronic part include an oil pressure switch, an air flow meter, a cam position sensor, a water temperature sensor, a crank position sensor, an intake air temperature sensor, and a vehicle speed sensor.

The heat resistance in the present invention means that the value of the "change rate (%)" determined in accordance with the following Mathematical formula 1 from the "properties such as hardness, elongation, tensile strength, and the like in the initial stage" and the "various properties after being left to stand at 120° C." is small.

[Mathematical formula 1]

"Change rate"(%)=("Value measured after endurance test"−"Value measured in initial stage")/"Value measured in initial stage"×100       Mathematical formula 1

In addition, the curable resin composition of the present invention is excellent in the heat resistance, therefore, is preferably used for a sealing agent for an in-vehicle control device case or an in-vehicle motor case of the electronic substrate described later, a potting agent for an in-vehicle electronic substrate or an in-vehicle electrical and electronic part, or the like.

EXAMPLES

Hereinafter, the present invention will be further explained in detail by way of Examples, but should not be limited at all by these Examples.

Examples 1 to 6 and Comparative Examples 1 to 8

Preparation of Curable Resin Compositions

Each component was blended in an amount of the parts by mass shown in Table 1, the components were mixed at room temperature (25° C.) for 60 minutes by a mixer under light shielding. The numerical values were all expressed by parts by mass.

Component (A)

a1: a (meth)acrylic polymer having (meth)acrylic groups at both ends, which has a viscosity (23° C.) of 515 Pa·s (product name: RC200C, manufactured by KANEKA CORPORATION)

a2: a (meth)acrylic polymer having (meth)acrylic groups at both ends, which has a viscosity (23° C.) of 165 Pa·s (product name: RC100C, manufactured by KANEKA CORPORATION)

Comparison Component of Component (A)

a'1: urethane (meth)acrylate (UV-3000B, manufactured by The Nippon Synthetic Chemical Industry Co., Ltd.)

Component (B)

b1: acryloyl morpholine (ACMO, manufactured by KJ Chemicals Corporation)

Comparison Component of Component (B)

b'1: dimethyl acrylamide (DMMA manufactured by KJ Chemicals Corporation)
b2: dimethylaminopropyl acrylamide methyl chloride quaternary salt (DMPAA-Q, manufactured by KJ Chemicals Corporation)
b'3: hydroxyethyl acrylamide (HEAA, manufactured by KJ Chemicals Corporation)
b'4: lauryl acrylate (LIGHT ACRYLATE L-A, manufactured by KYOEISHA CHEMICAL Co., LTD)
b'5: tetrahydrofurfuryl acrylate (LIGHT ACRYLATE THF-A, manufactured by KYOEISHA CHEMICAL Co., LTD)
b'6: 2-hydroxyethyl methacrylate (HO, manufactured by KYOEISHA CHEMICAL Co., LTD)
b'7: isobornyl acrylate (LIGHT ACRYLATE IBX-A, manufactured by KYOEISHA CHEMICAL Co., LTD)

Component (C)

c1: 2-hydroxy-2-methyl-1-phenyl-propane-1-one (DAROCUR1173, manufactured by BASF)

Characterization

Various properties were measured as follows.

Compatibility

Each curable resin composition was left to stand at room temperature (25° C.) for 24 hours, and the state of the liquid was observed. The evaluation criteria are as follows. The results were shown in Table 1.
◯: Liquid was not cloudy
X: Liquid was cloudy Measurement of Viscosity Each curable resin composition was measured at rotational speed of 10 rpm using a BH-type viscometer under the environment of 25° C. The results were evaluated based on the following evaluation criteria. The results were shown in Table 1.

Evaluation Criteria

◯: Viscosity was 200 Pa·s or less
X: viscosity exceeded 200 Pa·s

Measurement of Hardness

The curable resin composition was set to 2 mm in thickness, and irradiated at 45 kJ/m$^2$ by a UV irradiator to prepare a cured product having a sheet shape. While keeping a pressure surface of an A-type durometer (hardness meter) parallel to a test piece (in a state in which three sheets of the cured product having a sheet shape were stacked and was set to 6 mm in thickness), the pressure surface and the sample were brought into close contact with each other pressing with a force of 10 N. The maximum value was read at the time of measurement, and the maximum value was designated as the "hardness". The details were in accordance with JIS K 6253 (2012). Further, the hardness preferably exceeds 15 and less than 100, more preferably is 20 to 99, and furthermore preferably exceeds 50 and less than 80.

Measurement of Tensile Strength

The curable resin composition was set to 2 mm in thickness, and irradiated at 45 kJ/m$^2$ with UV rays to prepare a cured product having a sheet shape. The cured product was punched out by a No. 3 dumbbell to prepare a test piece. The test piece was at both ends to chucks such that the long axis of the test piece and each center of the chucks were in a straight line. The test piece was pulled at a tensile rate of 50 mm/min to measure the maximum load. The strength at the maximum load was designated as the "tensile strength (MPa)". The details were in accordance with JIS K 6251 (2010). In addition, the tensile strength is preferably 0.5 MPa or more, and more preferably 4.2 MPa or more. Further, the tensile strength is preferably 50 MPa or less, and more preferably 20 MPa or less.

Measurement of Elongation

The curable resin composition was set to 2 mm in thickness, and irradiated at 45 kJ/m$^2$ to prepare a cured product having a sheet shape. The cured product was punched out by a No. 3 dumbbell to prepare a test piece, and marked lines were marked on the test piece at intervals of 20 mm.

The test piece was fixed to chucks in the same manner as in the measurement of tensile strength, and pulled at a tensile rate of 500 mm/min until being cut. During the measurement, the test piece was elongated and each interval between the marked lines was enlarged, therefore, the interval between the marked lines was measured with a vernier caliper until the test piece was cut. The proportion of the elongation was designated as the "elongation (%)" based on the interval between the marked lines in the initial stage. In addition, the elongation is preferably 20% or more, and more preferably 100% or more. Further, the elongation is preferably 300% or less, and more preferably 200% or less.

Heat Resistance Test

Various test pieces prepared for the measurement in the initial stage were left to stand for 168 hours in a hot-air drying furnace set in an atmosphere of 120° C. The test pieces were taken out, and left to stand until reaching the room temperature, and then measured. The "change rate (%)" was calculated from the initial property and each property after the test pieces were left to stand at 120° C. in accordance with the following Mathematical formula 1, and evaluated based on the following evaluation criteria. The results were shown in Table 1.

[Mathematical formula 2]

"Change rate"(%)=("Value measured after endurance test"−"Value measured in initial stage")/"Value measured in initial stage"×100      Mathematical formula 1

In addition, in the present invention, the test pieces marked with the expression of "○" or "⊙" in various test results of the hardness, the elongation, and the tensile strength are excellent in the heat resistance, and therefore preferred.

Evaluation Criteria

⊙: Change rate is within ±10%
○: Change rate is larger than ±10%, and lass than ±25%
X: Change rate is ±25% or more

TABLE 1

| Component | | Example 1 | Example 2 | Example 3 | Example 4 | Example 5 | Example 6 | Comparative Example 1 | Comparative Example 2 |
|---|---|---|---|---|---|---|---|---|---|
| | a1 | 90 | 70 | | | | | 70 | |
| | a2 | | | 90 | 70 | 50 | 30 | | 70 |
| | a'1 | | | | | | | | |
| | b1 | 10 | 30 | 10 | 30 | 50 | 70 | | |
| | b'1 | | | | | | | 30 | 30 |
| | b'2 | | | | | | | | |
| | b'3 | | | | | | | | |
| | b'4 | | | | | | | | |
| | b'5 | | | | | | | | |
| | b'6 | | | | | | | | |
| | b'7 | | | | | | | | |
| | c1 | 3 | 3 | 3 | 3 | 3 | 3 | 3 | 3 |
| Compatibility | | ○ | ○ | ○ | ○ | ○ | ○ | ○ | ○ |
| Viscosity | | ○ | ○ | ○ | ○ | ○ | ○ | ○ | ○ |
| Measurement results in initial stage | Hardness (A) | 26 | 54 | 27 | 68 | 71 | 99 | 32 | 33 |
| | Tensile strength (MPa) | 0.9 | 8.1 | 0.9 | 6.3 | 13.4 | 25 | 1.2 | 1.3 |
| | Elongation (%) | 146 | 192 | 143 | 155 | 111 | 28 | 165 | 205 |
| Measurement results after heat resistance test | Hardness | ⊙ | ⊙ | ○ | ○ | ○ | ⊙ | ⊙ | X |
| | Tensile strength | ○ | ○ | ○ | ⊙ | ⊙ | ○ | X | X |
| | Elongation | ○ | ○ | ○ | ○ | ○ | ○ | ⊙ | ⊙ |

TABLE 1-continued

| Component | | Comparative Example 3 | Comparative Example 4 | Comparative Example 5 | Comparative Example 6 | Comparative Example 7 | Comparative Example 8 |
|---|---|---|---|---|---|---|---|
| a1 | | | | | | | |
| a2 | | 70 | 70 | 70 | 70 | 70 | |
| a'1 | | | | | | | 70 |
| b1 | | | | | | | 30 |
| b'1 | | | | | | | |
| b'2 | | 30 | | | | | |
| b'3 | | | 30 | | | | |
| b'4 | | | | 30 | | | |
| b'5 | | | | | 30 | | |
| b'6 | | | | | | 30 | |
| b'7 | | | | | | | |
| c1 | | 3 | 3 | 3 | 3 | 3 | 3 |
| Compatibility | | X | X | ○ | ○ | ○ | ○ |
| Viscosity | | ○ | ○ | ○ | ○ | ○ | ○ |
| Measurement results in initial stage | Hardness (A) | Unmeasured | Unmeasured | 10 | 13 | 51 | 62 |
| | Tensile strength (MPa) | Unmeasured | Unmeasured | 0.33 | 0.43 | 4.1 | 3.8 |
| | Elongation (%) | Unmeasured | Unmeasured | 160 | 1.55 | 105 | 170 |
| Measurement results after heat resistance test | Hardness | Unmeasured | Unmeasured | ◉ | X | ◉ | ○ |
| | Tensile strength | Unmeasured | Unmeasured | X | X | X | X |
| | Elongation | Unmeasured | Unmeasured | ○ | X | ○ | X |

In Table 1, it can be understood that the curable resin composition used in Examples 1 to 6, which corresponds to the present invention, has low viscosity, and the cured product to be obtained is excellent in the flexibility and the heat resistance. In addition, in Comparative Examples 1 to 7, the curable resin composition is a curable resin composition using any one of dimethyl acrylamide, dimethylaminopropyl acrylamide methyl chloride quaternary salt, hydroxyethyl acrylamide, lauryl acrylate, tetrahydrofurfuryl acrylate, 2-hydroxyethyl methacrylate, and isobornyl acrylate, which do not correspond to the component (B) of the present invention, and it can be understood that the curable resin composition is poor in the compatibility and the heat resistance as compared with those in Examples using acryloyl morpholine that is a component (B) of the present invention. In addition, in Comparative Example 8, curable resin composition using urethane (meth)acrylate, which is not the component (A) of the present invention, is used, and it can be understood that the curable resin composition is poor in the heat resistance as compared with that in Examples 2 and 4.

Example 7

Preparation of Two-Liquid Curable Resin Compositions

Agent A 60 parts by mass of RC100C that is a component (A) of the present invention, 10 parts by mass of acryloyl morpholine that is a component (B) of the present invention, 20 parts by mass of isobornyl acrylate, 10 parts by mass of ethylene oxide bisphenol A-type dimethacrylate, one part by mass of cumene hydroperoxide that is a component (C) of the present invention, 4 parts by mass of 3-acryloxypropyltrimethoxysilane as a silane coupling agent, and 2 parts by mass of hydrophobic fumed silica (R7200 manufactured by NIPPON AEROSIL CO., LTD.) as a filling material were added, and mixed at room temperature (25° C.) for 120 minutes by a planetary mixer to prepare an agent A.

Agent B 60 parts by mass of RC100C that is a component (A) of the present invention, 40 parts by mass of isobornyl acrylate, 0.05 part by mass of copper naphthenate (Naphthex Copper manufactured by NIHON KAGAKU SANGYO CO., LTD.) as a curing accelerator, 1 part by mass of saccharin, 0.5 part by mass of hydrazine, 0.2 part by mass of toluidine, and 2 parts by mass of hydrophobic fumed silica (R7200 manufactured by NIPPON AEROSIL CO., LTD.) as a filling material were added, and mixed at room temperature (25° C.) for 120 minutes by a planetary mixer to prepare an agent B.

Rubber Properties•Heat Resistance Test

An agent A and an agent B were filled in a twin cartridge, and mixed by using a static mixer having 12 elements as a mixing nozzle to obtain a composition. The viscosity at 25° C. of the obtained composition was 200 Pa·s or less. Next, the mixed curable resin composition was sandwiched between two plates of the aluminum plate coated with a fluorine resin, and cured to a sheet shape having a thickness of 2 mm (curing conditions: left to stand at 23° C. for 24 hours), and the cured curable resin composition was cut out into a shape of a JIS No. 3 dumbbell piece to prepare a test piece. After that, the hardness, the elongation, and strength were measured under the similar conditions as in the above. As a result, the hardness was A67, the elongation was 130%, and the tensile strength was 4.3 MPa. From these results, it was confirmed that a flexible cured product was obtained. In addition, when a heat resistance test was performed for a test piece prepared for the measurement in the initial stage under the similar conditions as in the above, "○" was obtained in each test result of the hardness, the elongation, and the tensile strength, and it was able to be confirmed that a cured product having excellent heat resistance was obtained.

INDUSTRIAL APPLICABILITY

The curable resin composition of the present invention has low viscosity, of which the cured product is excellent in the flexibility and the heat resistance, therefore, is extremely effective as various applications of a sealing agent, a sealing material, a potting agent, an adhesive agent, a coating material, a lining material, an adhesive agent, and the like, and can be applied in a wide range of fields.

Further, the application of the present invention is not limited to the embodiments described above, and appropriate changes may be made in the range where the gist of the present invention is not impaired.

This application is based on Japanese Patent Application No. 2014-198112, filed with the Japan Patent Office on Sep. 29, 2014, the entire content of which is hereby incorporated by reference.

The invention claimed is:

1. A curable resin composition comprising:
a (meth)acrylic group-containing vinyl-based polymer (A), a monomer (B) represented by the following Chemical formula (1), and a radical initiator (C)

[Chemical formula 1]

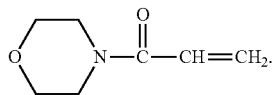
(1)

wherein the component (A) has a (meth)acrylic group where at least one (meth)acrylic group is at an end of the molecule, and the component (A) is a polymer having a main chain skeleton derived from a (meth) acrylic monomer,
wherein the component (B) is contained in an amount of 30 to 90 parts by mass based on 100 parts by mass of the total amount of the components (A) and (B),
wherein the component (C) is contained in an amount of 0.5 to 5 parts by mass based on 100 parts by mass of the total amount of the components (A) and (B),
wherein the curable resin composition does not comprise a compound having a (meth)acryloyl group, other than component (A) and component (B), and
wherein change rate of the tensile strength of a cured product thereof after heat-resistance test for 168 hours at 120° C. is less than ±25%.

2. The curable resin composition according to claim 1, wherein
the radical initiator (C) is a photoradical polymerization initiator or an organic peroxide.

3. The curable resin composition according to claim 1, wherein
the curable resin composition is a curable resin composition for a sealing agent or a potting agent.

4. The curable resin composition according to claim 1, wherein
the curable resin composition is a curable resin composition for a sealing agent for an in-vehicle control device case or an in-vehicle motor case.

5. The curable resin composition according to claim 1, wherein
the curable resin composition is a curable resin composition for potting for an in-vehicle electrical and electronic part.

6. The curable resin composition according to claim 1, wherein said composition further comprising saccharine.

7. The curable resin composition according to claim 1, wherein a change rate of the hardness or tensile strength of a cured product thereof after said heat-resistance test of 168 at 120° C. is 10% or less.

8. The curable resin composition according to claim 1, wherein said component (A) has a viscosity of 100 to 1000 Pa-s at a temperature of 23° C.

9. The curable resin composition according to claim 1, wherein the component (C) is contained in an amount of 3 to 5 parts by mass based on 100 parts by mass of the total amount of the components (A) and (B).

10. The curable resin composition according to claim 1, wherein the component (B) is contained in an amount of 50 to 90 parts by mass based on 100 parts by mass of the total amount of the components (A) and (B).

11. The curable resin composition according to claim 1, wherein the component (B) is contained in an amount of 30 to 50 parts by mass based on 100 parts by mass of the total amount of the components (A) and (B).

* * * * *